P. D. SKAHEN.
ANTISKID DEVICE FOR VEHICLE WHEELS.
APPLICATION FILED NOV. 5, 1918.
1,294,716.
Patented Feb. 18, 1919.
2 SHEETS—SHEET 1.
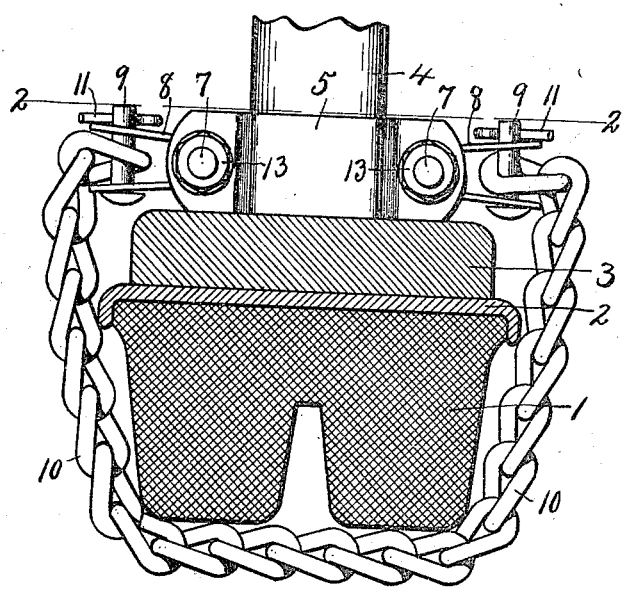
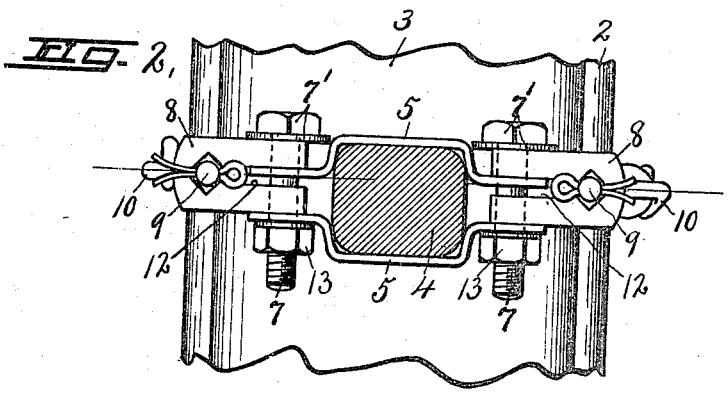
INVENTOR
P. D. Skahen
BY Howard P. Denison
ATTORNEY

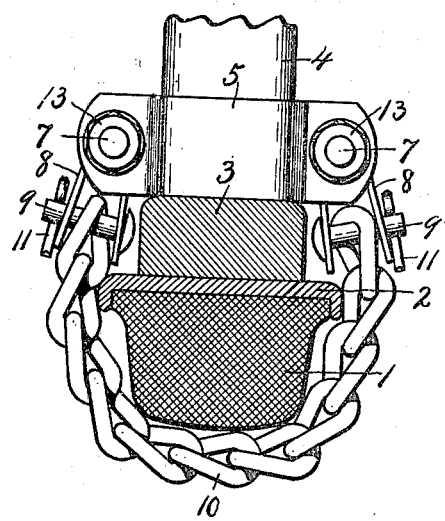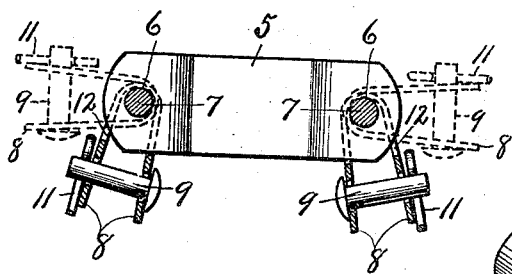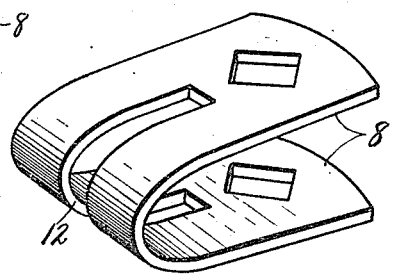

UNITED STATES PATENT OFFICE.

PATRICK D. SKAHEN, OF SYRACUSE, NEW YORK.

ANTISKID DEVICE FOR VEHICLE-WHEELS.

1,294,716.	Specification of Letters Patent.	Patented Feb. 18, 1919.

Application filed November 5, 1918. Serial No. 261,232.

*To all whom it may concern:*

Be it known that I, PATRICK D. SKAHEN, a citizen of the United States of America, and resident of Syracuse, in the county of Onondaga, in the State of New York, have invented new and useful Improvements in Antiskid Devices for Vehicle-Wheels, of which the following, taken in connection with the accompanying drawings, is a full, clear, and exact description.

This invention relates to certain improvements in anti-skid devices for vehicle wheels but more particularly for truck wheels having solid elastic tires in which one or more cross-chains passing around the tread of the tire are attached to suitable clamping devices embracing the individual spokes in such a manner that the cross-chains may be easily and quickly removed or replaced without removing the clamping devices.

It is well known that the transverse width of the rims and fellies varies materially in different wheels according to the width of the tire, as for example in heavy automobile trucks it is a common practice to use single tires on the front wheel and dual-tires on the rear or traction wheels with corresponding variations in the widths of the rims and fellies, and one of the main objects of my present invention is to provide an anti-skid device which may be used with fellies and rims of different widths without liability of excessive marring or mutilating the fellies by frictional contact with the cross-chains.

In other words I have sought to provide an anti-skid device capable of quick adjustment to tires and fellies of different widths in which the cross-chains are free to play back and forth lengthwise of and upon the periphery of the tire without frictional contact with the felly.

Another object is to provide the clamping device with radially flexing extensions arranged in such manner that the same bolts which tighten the clamping plates upon the spoke also serve to tighten the extensions against radial movement when the anti-skidding device is adjusted for use.

Other objects and uses relating to specific parts of said device will be brought out in the following description.

In the drawings:—

Figure —1— is a transverse sectional view of a portion of a dual-tire rim and felly of a vehicle wheel showing a portion of one of the spokes and my improved anti-skid device attached thereto.

Fig. —2— is an inner face view of the same parts partly in section taken on line 2—2, Fig. —1—.

Fig. —3— is a transverse sectional view similar to Fig. —1— except that it shows a single tire wheel and the same anti-skidding device adjusted to conform to that type of wheel.

Fig. —4— is a transverse sectional view through the clamping device and flexing extensions on the ends thereof, said extensions being shown by full lines in position for use with the single tire wheels and by dotted lines in position for use with dual-tire wheels.

Fig. —5— is a perspective view of one of the detached extensions of the clamping devices.

Each of the wheels shown in Figs. —1— and —3— is provided with a solid rubber or equivalent elastic tire —1—, a rim —2—, a felly —3— and the usual number of spokes —4—, the only substantial difference being that the dual tire and felly shown in Fig. —1— is considerably wider than that shown in Fig. —3—.

The anti-skid device forming the subject matter of my invention is adapted to be used with either of these wheels and comprises a pair of opposed clamping plates —5— having their opposite ends provided with bolt-openings —6— for receiving clamping bolts —7— upon which are mounted radial extensions —8—, said extensions being provided with pins —9— for receiving and supporting the ends of a cross-chain —10—.

The clamping plates —5— are adapted to embrace the outer ends of the spoke —4— and to rest against the inner face of the felly —3— and in order that they may be interchanged by reversal or inversion, they are made substantially identical and therefore may be formed by the same dies or molds which greatly reduce the cost of manufacture and facilitates the assembling of the various parts upon the wheel.

These plates are preferably made of strap steel or equivalent, strong or durable metal and their central portions are preferably pressed outwardly beyond the planes of their ends to form recesses in their adjacent faces for receiving the corresponding portions of the spoke —4— leaving the corresponding ends of the plates in spaced relation to enable the plates to be tightly clamped to the spoke by means of the bolts —7— which extend circumferentially in parallelism uniform distances from opposite sides of the spoke.

The extensions consist of similar U-shaped loops of sheet steel or equivalent metal having their closed sides embracing their respective bolts —6— so as to be readily adjustable radially about the axes thereof, the opposite arms of each extension being provided with registering apertures for the reception and retention of the pins —9— which latter are held in their respective apertures by cotter pins —11— to permit them to be easily and quickly removed and replaced when attaching or removing the cross-chains —10—.

These extensions are preferably identical in construction and therefore may be formed from the same dies or molds and are interchangeable from one side to the other to facilitate assembling, each extension being provided with a central lengthwise slot —12— through the closed side and adjacent portions of the opposite arms thereof for receiving the opposite ends of one of the clamping plates —5—, as shown more clearly in Fig. —2—, so that when the parts of the clamping device are assembled upon the spoke, portions of the extensions —8— at one side of the slot —12— will be interposed between the adjacent ends of the plates —5— while the portions of said extensions at the opposite side of the slot will be interposed between the ends of the plate —5— which enter the slot and the outer ends or heads, as —7'—, of the clamping bolts —7—, the threaded ends of said bolts being provided with nuts —13— for tightening and releasing purposes.

That is the same bolts —7— serve the double purpose of tightening the clamping plates —5— upon the spoke —4— and also of clamping the extensions —8— in their radially adjusted positions so as to project outwardly beyond the opposite edges of the felly —3—, as shown in Fig. —1—, or to hang radially of the wheel, as shown in Fig. —3—.

It will be noted however, that in either position of adjustment the extensions —8— are of sufficient length to support the pins —9— beyond the opposite edges of the felly thereby supporting the adjacent end of the chain a sufficient distance beyond the edges of the felly to prevent excessive marring or mutilating thereof as the chain oscillates circumferentially of the periphery of the tire.

In assembling this anti-skidding device upon the spokes the opposite plates —5— are placed against opposite faces of the spoke with their recesses registering therewith and their outer edges resting against the inner face of the felly after which the extensions —8— are placed in operative position and the bolts —7— are then passed through the apertures in the ends of both plates and through the opening between the opposite arms of the extensions, the nuts —13— being then tightened to clamp the plates to the spoke and also to clamp the extensions to the plates.

The links at or near the ends of the cross-chain are then registered with their respective apertures in the extensions —8— whereupon the pins —9— are inserted through said apertures and links registering therewith and fastened in place by the cotter-pins —11—, the entire device being then ready for use.

If the device is to be used with wide fellies as shown in Fig. —1— the extensions —8— may be rocked to a plane substantially parallel with the longitudinal center of the plates —5— and the clamping bolts —7— may then be tightened sufficiently to hold them in that position.

On the other hand, if the device is to be used with narrower or single tire fellies the extensions —8— may be rocked outwardly or radially of the wheel to positions nearly at right angles to the longitudinal center of the plates —5— and reclamped in that position by the bolts —7— if desired.

In order to remove the cross-chain it is simply necessary to withdraw the cotter-pins and then to withdraw the pins —9— sufficiently to permit the removal of the chain therefrom after which the pins —9— may be restored and held in place by their cotter pins —11—, the reverse operation being necessary for replacing the cross-chain, it being understood that the clamping plates —5— with the extensions —8— thereon may be left upon the spoke of the wheel ready for attachment of the chains at any time.

What I claim is:

1. An anti-skid device comprising, in combination with the tire, rim, felly and spokes of a vehicle wheel, clamping plates embracing one of the spokes and provided with circumferentially extending bolts at opposite sides of the spokes for tightening the clamp on the spoke, extensions embracing said bolts and provided with radial pins, and a chain across the tread of the tire and having its ends attached to said pins.

2. An anti-skid device comprising, in combination with the tire, rim, felly and spokes of a vehicle wheel, clamping plates embracing one of the spokes and provided with circumferentially extending bolts at opposite sides of the spoke for tightening the clamp on the spoke, extensions embracing said bolts and provided with radial pins, and a chain across the tread of the tire and having its ends attached to said pins, portions of said extensions being interposed between the heads of the bolts and adjacent ends of one of the clamping plates to be tightened by said bolts when the clamp is tightened on the spoke.

3. An anti-skid device comprising, in combination with the tire, rim, felly and spokes of a vehicle wheel, clamping plates embracing one of the spokes, U-shaped extensions having their closed ends slotted lengthwise to receive the adjacent ends of one of the plates, bolts passed through the ends of the plates and extensions for tightening said plates on the spoke and attaching the extensions to the plates, pins passed through the opposite arms of said extensions, and a chain across the tread of the tire and having its ends engaged with said pins.

4. An anti-skid device comprising, in combination with the tire, rim, felly and spokes of a vehicle wheel, clamping plates embracing one of the spokes, bolts passed through opposite ends of the plates for tightening them upon the spoke, extensions hinged to said bolts and provided with pins, and a chain extending across the tread of the tire and attached to said pins.

5. An anti-skid device comprising, in combination with the tire, rim, felly and spokes of a vehicle wheel, clamping plates embracing one of the spokes, bolts passed through opposite ends of the plates for tightening them upon the spoke, extensions hinged to said bolts and provided with pins, and a chain extending across the tread of the tire and attached to said pins, portions of said extensions being interposed between the adjacent ends of the plates.

6. An anti-skid device comprising, in combination with the tire, rim, felly and spokes of a vehicle wheel, clamping plates embracing one of the spokes, bolts passed through opposite ends of the plates for tightening them upon the spoke, extensions hinged to said bolts and provided with pins, and a chain extending across the tread of the tire and attached to said pins, portions of said extensions being interposed between the ends of one of the plates and heads of the adjacent bolts whereby the extensions may be tightened in their adjusted positions by the same bolts which tighten the clamping plates in the spoke.

In witness whereof I have hereunto set my hand this 2nd day of November 1918.

PATRICK D. SKAHEN.

Witnesses:
H. E. CHASE,
ETHEL M. WILLIAMS.

Copies of this patent may be obtained for five cents each, by addressing the "Commissioner of Patents, Washington, D. C."